United States Patent
Holma et al.

(10) Patent No.: US 7,411,931 B2
(45) Date of Patent: Aug. 12, 2008

(54) INTER-FREQUENCY MEASUREMENTS WITH MIMO TERMINALS

(75) Inventors: Harri Holma, Irving, TX (US); Antti Toskala, Espoo (FI)

(73) Assignee: Nokia Corporation, Espoo (FI)

(*) Notice: Subject to any disclaimer, the term of this patent is extended or adjusted under 35 U.S.C. 154(b) by 144 days.

(21) Appl. No.: 10/790,831

(22) Filed: Mar. 3, 2004

(65) Prior Publication Data

US 2004/0171384 A1    Sep. 2, 2004

Related U.S. Application Data

(63) Continuation of application No. 10/113,690, filed on Apr. 2, 2002, now Pat. No. 6,741,587.

(51) Int. Cl.
*H04Q 7/38* (2006.01)
*H04B 7/00* (2006.01)
*H04B 7/08* (2006.01)
*H04L 27/04* (2006.01)

(52) U.S. Cl. ............ 370/335; 370/310.2; 370/362; 455/24; 455/132; 455/332; 375/130; 375/295; 375/332

(58) Field of Classification Search ......... 370/310–350; 709/231, 235; 455/24, 132, 332, 436, 70, 455/69, 45; 375/130, 295, 316, 332

See application file for complete search history.

(56) References Cited

U.S. PATENT DOCUMENTS

| | | | | |
|---|---|---|---|---|
| 6,049,535 | A * | 4/2000 | Ozukturk et al. | 370/335 |
| 6,507,570 | B1 * | 1/2003 | Holma et al. | 370/333 |
| 2001/0016482 | A1 * | 8/2001 | Bergstrom et al. | 455/332 |
| 2002/0178277 | A1 * | 11/2002 | Laksono | 709/231 |

FOREIGN PATENT DOCUMENTS

EP    0 984 649    3/2000

(Continued)

OTHER PUBLICATIONS

3GPP TS 25.212 v3.9.0 (Mar. 2002) Technical Specification, 3rd Generation Partnership Project: Technical Specification Group Radio Access Network; Multiplexing and channel coding (FDD) (Release 1999), pp. 1-62.

(Continued)

*Primary Examiner*—Afsar M. Qureshi
(74) *Attorney, Agent, or Firm*—Squire Sanders & Dempsey L.L.P.

(57) ABSTRACT

The invention is a terminal, system and method for providing inter-frequency and inter-system handovers. A terminal 20' in accordance with the invention includes at least one radio transceiver including P radio receivers and at least one transmitter (16) with P being an integer at least equal to 2. Each radio receiver includes an antenna (41) which receives M encoded data streams. A terminal controller 18 controls the that at least one radio transceiver. In response to a transmission that the terminal is to operate at least one of the radio receiver chains in at least one frequency band not used to receive the M encoded data streams during at least one identified data frame therein to measure a radio indicator of the at least one frequency band not used to receive the M encoded data streams, the terminal controller causes at least one of the radio receiver chains to be turned to the at least one frequency band during the at least one identified data frame and to make measurements therein and to transmit the measurements with at least one transmitter of the at least one radio transceiver to a station (24).

19 Claims, 3 Drawing Sheets

FOREIGN PATENT DOCUMENTS

| | | |
|---|---|---|
| GB | 2 354 671 | 9/1999 |
| WO | 97/01256 | 1/1997 |
| WO | WO 98/54849 | 12/1998 |

OTHER PUBLICATIONS

3GPP TS 25.2213 v3.7.0 (Dec. 2001) Technical Specification, 3$^{rd}$ Generation Patnership Project; Technical Specification Group Radio Access Network; Spreading and modulation (FDD) (Release 1999), pp. 1-26.

3GPP TS 25.214 v3.9.0 (Dec. 2001) Technical Specification, 3$^{rd}$ Generation Partnership Project; Technical Specification Group Radio Access Network; Physical layer procedures (FDD) (Release 1999), pp. 1-52.

3GPP TS 25.215 v3.9.0 (Dec. 2001) Technical Specification, 3$^{rd}$ Generation Partnership Project; Technical Specification Group Radio Access Network; Physical layer—measurements (FDD) (Release 1999), pp. 1-17.

3GPP TS 25.133 v3.9.0 (Mar. 2002) Technical Specification, 3$^{rd}$ Generation Partnership Project; Technical Specification Group Radio Access Network; Requirements for support of radio resource management (FDD) (Release 1999), pp. 1-137.

3GPP TS 25.331 v3.9.0 (Dec. 2001) Technical Specification, 3$^{rd}$ Generation Partnership Project; Technical Specification Group Radio Access Network; Radio Resource Control (RRC) Protocol Specification (Release 1999), pp. 1-800.

3GPP TS 25.211 v3.9.0 (Dec. 2001) Technical Specification, 3$^{rd}$ Generation Partnership Project; Technical Specification Group Radio Access Network; Physical channels and mapping of transport channels onto physical channels (FDD) (Release 1999), pp. 1-46.

3GPP TS 23.228 v5.0.0 (Apr. 2001) Technical Specification, 3$^{rd}$ Generation Partnership Project; Technical Specification Group Services and System Aspects; IP Multimedia (IM) Sybsystem—Stage 2 (Release 5), pp. 1-126.

3GPP TS 25.848 v4.0.0 (Mar. 2001) Technical Specification, 3$^{rd}$ Generation Partnership Project; Technical Specification Group Radio Access Network; Physical layer aspects of UTRA High Speed Downlink Packet Access (Release 4), pp. 1-89.

3GPP TR 25.848, 3$^{rd}$ Generation Partnership Project; Technical Specification Group Radio Access Network; Physical layer aspects of UTRA High Speed Downlink Packet Access (Release 4), Mar. 2001, pp. 1-89.

* cited by examiner

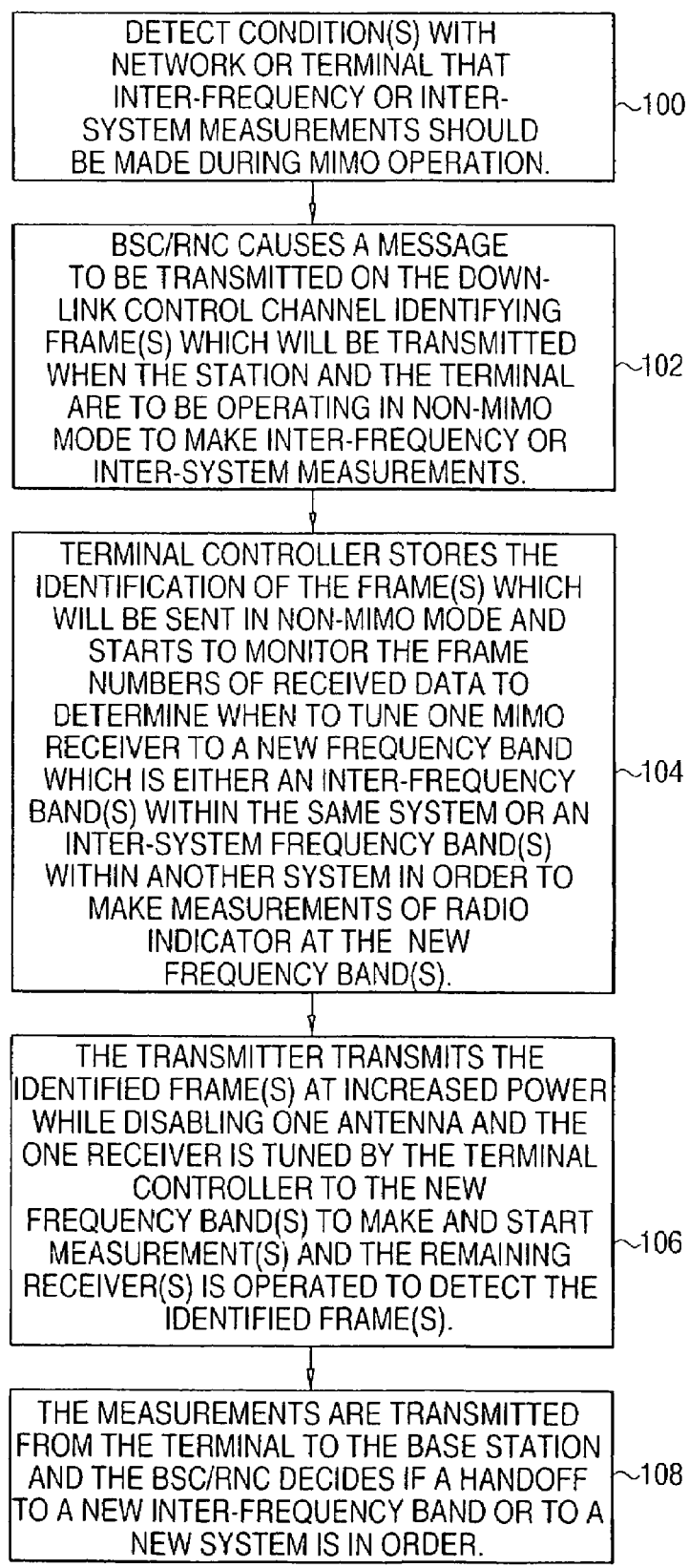

INTER-FREQUENCY MEASUREMENTS WITH MIMO TERMINALS

This application is a continuation application of U.S. patent application Ser. No. 10/113,690, filed Apr. 2, 2002 now U.S. Pat. No. 6,741,587, the subject matter of which is incorporated herein by reference.

BACKGROUND OF THE INVENTION

1. Field of the Invention

The present invention relates to a system, method and terminal for making inter-frequency and inter-system measurements for controlling reliable handovers therein and therein between.

2. Description of the Prior Art

FIG. 1 illustrates "compressed mode" which is used in wideband code division multiple access (WCDMA) to make inter-frequency measurements by user equipment (UE). Compressed mode in Release 99 (3GPP TR 25.211-25.215 which describes the physical layer, 3GPP TR 25-331 which describes the radio resource control protocol, and 3GPP TR 25-133 which describes requirements for radio resource management) uses a terminal having a single receiver. The main features of compressed mode in making inter-frequency measurements are: (1) measurement times are controlled by the radio access network (RAN); (2) measurement gaps are within a frame which are typically seven milliseconds in duration during which inter-frequency measurements are made; (3) no data transmission occurs during the gaps; and (4) higher power transmission is used during the other parts of the frame to compensate for the gap. The gap is created by increasing the data transmission rate in the frame so that the data payload transmitted in the frame takes less time providing for the measurement gap.

See the 3GPP Technical Reports TR 25.212 and 25.331 for a description of compressed mode which are incorporated herein by reference in their entirety.

A main disadvantage of inter-frequency measurements using a single receiver is the requirement that the receiver has to process higher data rates in frame(s) with the gaps (frame #2 of FIG. 1) than normal data rates (frames #1 and #3 of FIG. 1). Furthermore, the data transmissions in the frame(s) with the gap are at a higher power level to accommodate the lost transmission energy in the gap period.

FIG. 2 describes a prior art system based upon Section 6.5 "Multiple Input Multiple Output [MIMO] Antenna Processing in the 3GPP Technical Report 25.848 v4.0.0 2001-03 which is incorporated herein by reference in its entirety. The diversity system 10 utilizes known multiple downlink transmit antennas for second order applications in the UTRA Release 99 Specifications. These techniques exploit spatial and/or polarization decorrelations over multiple channels to achieve fading diversity gain.

MIMO systems use multiple antennas at the station transmitter and terminal receiver which provide advantages in comparison to transmissions using conventional single antennas. If multiple antennas are used at both the transmitter and the receiver, the peak throughput is increased using a technique known as code re-use. With code re-use, each channelization/scrambling code pair allocated for the HSS-DSCH transmission can modulate up to M distinct data streams where M is the number of base station transmitter antennas. Data streams which share the same channelization/scrambling code must be distinguished based on their spatial characteristics, requiring a receiver with at least M antennas. In principal, the peak throughput with code re-use is M times the rate achievable with a single transmit antenna. Third, with code re-use, some intermediate data rates can be achieved with a combination of code re-use and smaller modulation constellations, e.g. the 16 QAM instead of 64 QAM. Compared to a single antenna transmission scheme with a larger modulation constellation to achieve the same data rate, the code re-use technique may have a smaller required Eb/No, resulting in overall improved system performance. This technique is open loop since the transmitter does not require feedback from the UE other than the conventional HSPDA information required for rate determination. Further performance gains can be achieved using closed-loop MIMO techniques whereby the transmitter employs feedback information from the UE. For example, with knowledge of channel realizations, the transmitter could transmit on an orthogonal Eigen modes eliminating the spatial multiple-access interference. See Section 5.3 of the aforementioned Technical Report TR 25.848.

The system 10 illustrated in FIG. 2 is comprised of a MIMO transmitter 21 having M antennas 25 based on FIG. 6 in the aforementioned Section 6.5 in combination with a MIMO terminal 20' including a receiver 20 having P antennas based on FIG. 7 of the aforementioned Section 6.5. The diagram of FIG. 6 has been modified to include a receiver 12 associated with the MIMO transmitter 21. The transceiver 24 is used at a station and is controlled by a base station controller/radio network controller 14. Similarly, FIG. 7 has been modified to include a MIMO UE 20'. The UE 20' includes a transmitter 16 and a controller 18 which are utilized with the MIMO receiver 20. The UE 20' is coupled by a radio link 22 containing uplink and downlink radio channels to the transceiver 24 containing the receiver 12 and transmitter 21.

The transceiver 24 receives a coded high rate data stream 26 which is inputted to a demultiplexer 28. The demultiplexer 28 demultiplexes the coded high rate data stream 26 into M data streams 30. The M data streams 30 are spread by N spreading codes applied to spread data functions 32. The spread data functions 32 produce MN substreams of the M substreams outputted by the demultiplexer 28. The M substreams (m=1 . . . M) of each group are summed by summers 34 and multiplied in multiplexers 36 by scrambling code and transmitted over the Mth antenna so that the substreams sharing the same code are transmitted over different antennas. Mutually orthogonal dedicated pilot symbols are also added by the summers 34 to each antenna's common pilot channel (CPICH) to allow coherent detection. For M=2 or for 4 antennas, the pilot symbol sequences 4, respectively, two antenna STTD or 4 antenna closed-loop diversity can be used.

The UE 20' distinguishes the M substreams sharing the same code. P antennas 41 receive the M substreams and spatial signal processing is used to decode the M substreams. For coherent detection at the UE 20', complex amplitude channel estimates are required for each transmit/receive antenna pair. In a flat fading channel, the channel is characterized by MP complex channel coefficients. In frequency selective channels, the channel is characterized by LMP coefficients where L is the number of RAKE receiver fingers. Channel estimates can be obtained by correlating the received signals with the M orthogonal pilot sequences. Compared to a conventional single antenna receiver, the channel estimation complexity is higher by a factor of M. For data detection, each antenna is followed by a bank of filters matched to the N spreading codes. In general, there are LN despreaders 40 per antenna. For each of the MN distinct data streams, the LP corresponding despreader outputs are each weighed by the complex conjugate of the corresponding channel estimate 42 and summed together by the space time rate combiner 44. The space-time-rate combiner is a multiple antenna generalization of a conventional rake combiner. The space time rate combiner 44 outputs are inputted to a detector 46 which may be VBLAST detector. The outputs of the VBLAST detector 46 are applied to a multiplexer 48 which outputs multiplexed data.

Inter-frequency operation involves the hand-off of the user UE 20' from one frequency band to another frequency band within a frequency allocation of the system in which the UE is currently registered. Inter-frequency hand-offs may be made for diverse reasons, such as loading of the channels, error rates associated with the transmission of the data, etc.

Inter-system hand-offs involve the hand-off of the UE 20' from a frequency band in one system in which the UE is currently registered to a frequency band in another system in which the UE is not currently registered.

While the MIMO system 10 of the prior art has improved performance in comparison to a non-MIMO receiver, in order to provide reliable hand-offs to inter-frequencies or inter-system hand-offs, it is necessary for the system 10 to obtain measurements from the UE 20' which enable the BSC/RNC 14 to make a determination of whether or not a hand-off should be made from the current frequency band in which the UE 20 is operating to another frequency band and furthermore, if such a handoff is to be made, whether it should be inter-frequency hand-off within the same system, e.g. WCDMA or GSM, or between systems e.g., WCDMA to GSM or GSM to WCDMA.

SUMMARY OF THE INVENTION

The present invention provides a reliable data transmission method and system including a station transceiver having a transmitter, including multiple antennas and at least one UE having a radio transceiver, including multiple radio receivers each with an antenna. The system includes a station controller which controls the station transceiver to transmit encoded data streams using the multiple antennas to multiple radio receivers in at least one radio transceiver of the UE terminal. Preferably, the system of the invention operates with MIMO principals. Unlike the compressed mode of the prior art in which the data transmission rate is varied, the present invention makes radio indicator measurements during transmission of multiple data streams from the multiple antennas of the station transceiver to at least one transceiver including multiple receivers each with an antenna. During measurement of the radio indicator, at least one receiver receives at least one frequency band which is not used to receive the encoded data streams during at least one identified data frame to measure the radio indicator of the at least one frequency band which is not used to receive the encoded data streams. The radio indicator uses many different measurement criteria and includes, without limitation, pilot signal power, total received signal power, Ec/10 and cell identification measurements. The terminal controller of the UE causes the at least one radio receiver to tune to the at least one frequency band during the at least one identified data frame and to make radio indicator measurements therein and transmit the measurements to at least one transmitter of the at least one radio transceiver which transmits the measurements to the station. A base station controller or radio network controller of the station, based upon the measurements, controls whether or not the transceiver associated with the station commands the UE to stay tuned to a current frequency band, to jump to another inter-frequency band, or to jump to a frequency band in another system.

The present invention uses the MIMO architecture in a UE to periodically use at least one radio receiver to make inter-frequency or inter-system radio indicator measurements. During the at least one frame, which is used for making of the radio indicator measurements, the power level transmitted to the UE is boosted in the remaining receivers so that data transmission and detection is ongoing to the UE at the same time that the radio indicator measurements are being made. As a result, the MIMO architecture is utilized for a dual role of data reception and radio indicator measurements without requiring a dedicated receiver to measure only the radio indicator. The first role obtains better reception consequent from the advantages of MIMO in comparison to non-MIMO systems and the second role, as a result of having multiple receivers normally used to receive multiple data streams, permits the functions of the receivers to be split up between data reception and making radio indicator measurements so as to facilitate the decision making process of whether or not the UE should be commanded to move to a new frequency band for diverse reasons, such as load factors, bit error rate, etc.

In a data transmission system including a station which transmits M encoded data streams using M antennas to a terminal and a station controller which controls the station, wherein M is an integer at least equal to 2, a terminal in accordance to the invention includes at least one radio transceiver including P radio receivers and at least one transmitter with P being an integer at least equal to 2, each radio receiver including an antenna which receives the M encoded data streams and a detecting function which decodes the M encoded data streams into decoded data; and a terminal controller which controls the at least one radio transceiver; and wherein in response to a transmission from the station that the terminal is to operate at least one of the radio receivers in at least one frequency band not used to receive the M encoded data streams during at least one identified data frame therein to measure a radio indicator of the at least one frequency band, the terminal controller causes at least one of the radio receivers to be tuned to the at least one frequency band not used to receive the M encoded data streams during the at least one identified data frame and to make measurements therein and to transmit the measurements with the at least one transmitter of the at least one radio transceiver to the station. The at least one frequency band may be an inter-frequency band in the data transmission system or in another system than the data transmission system. The station may comprise a demultiplexer which demultiplexes an input data stream into M substreams, each substream may be spread with one of N spreading codes where N is an integer at least equal to 2 with a mutually orthogonal pilot symbol being added to a common pilot channel transmitted by each antenna; and wherein the at least one transceiver may comprise in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the M data streams, and a multiplexer, coupled to the outputs of the detector which outputs a multiplexed data stream corresponding to the input data stream. The terminal may use wide band code division multiple access (WCDMA) for receiving the M encoded streams, global system for mobile communications (GSM) for receiving the M encoded data streams, or the terminal may use wide band code division multiple access (WCDMA) for receiving the M encoded data streams and another system may use global system for mobile communications (GSM). The terminal may use global system for mobile communications (GSM) for receiving the M encoded data streams and the another system may use wide band code division multiple access (WCDMA). The radio indicator may be pilot signal power, total received signal power, Ec/10, or cell identification.

A data transmission system in accordance with the invention includes a terminal; a station which transmits M encoded data streams using M antennas to the terminal wherein M is an integer at least equal to 2; a station controller which controls the station; the terminal including at least one radio transceiver including P receivers and at least one transmitter, with P being an integer at least equal to 2, each radio receiver including an antenna which receives the M encoded data streams and a detecting function which decodes the M encoded data streams into decoded data; and a terminal controller which controls the at least one radio transceiver; and wherein in response to a transmission from the station that the terminal is to operate at least one of the radio receivers in at least one frequency band not used to receive the M data streams during at least one identified data frame therein to measure a radio indicator of the at least one frequency band not used to receive the M encoded data streams, the terminal controller causes at least one of the radio receivers to be tuned to the at least one frequency band during the at least one identified data frame and to make measurements of the radio energy therein and to transmit the measurements with the at least one transmitter of the at least one radio transceiver to the station. The at least one frequency band may be an inter-frequency band in the data transmission system or in another system than the data transmission system. The station may comprise a demultiplexer which demultiplexes an input data stream into M substreams, each substream may be spread with one of N spreading codes where N is an integer at least equal to 2 with a mutually orthogonal pilot symbol being added to a common pilot channel transmitted by each antenna; and wherein the at least one transceiver may comprise in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the M data streams, and a multiplexer, coupled to the outputs of the detector which outputs a multiplexed data stream corresponding to the input data stream. The terminal may use wide band code division multiple access (WCDMA) for receiving the M encoded data streams, global system for mobile communications (GSM) for receiving the M encoded data streams, or the terminal may use wide band code division multiple access (WCDMA) for receiving the M encoded data streams and another system may use global system for mobile communications (GSM). The terminal may use global system for mobile communications (GSM) for receiving the M encoded data streams and the another system may use wide band code division multiple access (WCDMA). The M encoded data streams may be transmitted with a higher power level during the at least one identified frame than a power level used to transmit other frames of the encoded data streams. The radio indicator may be pilot signal power, total received signal power, Ec/10 or cell identification.

In a data transmission system including a station which transmits M encoded data streams using M antennas to a terminal comprising at least one radio transceiver including P radio receivers and at least one transmitter with P being an integer at least equal to 2, each radio receiver including an antenna which receives the M encoded data streams and a detecting function which decodes the M encoded data streams into decoded data, a station controller which controls the station, wherein M is an integer at least equal to 2, and a terminal controller which controls the that at least one radio transceiver, a method in accordance with the invention includes in response to a transmission from the station that the terminal is to operate at least one of the radio receivers in at least one frequency band not used to receive the M encoded data streams during at least one identified data frame therein to measure a radio indicator of the at least one frequency band not used to receive the M encoded data streams, the terminal controller causes at least one of the radio receivers to be tuned to the at least one frequency band during the at least one identified data frame and to make measurements therein and to transmit the measurements with the at least one transmitter of the at least one radio transceiver to the station. The at least one frequency band may be an inter-frequency band in the data transmission system or another system than the data transmission system. The station may comprise a demultiplexer which demultiplexes an input data stream into M substreams, each substream may be spread with one of N spreading codes where N is an integer at least equal to 2 with a mutually orthogonal pilot symbol being added to a common pilot channel transmitted by each antenna; and wherein the at least one transceiver may comprise in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the M data streams, and a multiplexer, coupled to the outputs of the detector which outputs a multiplexed data stream corresponding to the input data stream. The station may comprise a demultiplexer which demultiplexes an input data stream into M substreams, each substream may be spread with one of N spreading codes where N is an integer at least equal to 2 with a mutually orthogonal pilot symbol being added to a common pilot channel transmitted by each antenna; and wherein the at least one transceiver may comprise in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the M data streams, and a multiplexer, coupled to the outputs of the detector which outputs a multiplexed data stream corresponding to the input data stream. The terminal may use wide band code division multiple access (WCDMA) for receiving the M encoded streams the terminal uses global system for mobile communications (GSM) for receiving the M encoded data streams. The terminal may use wide band code division multiple access (WCDMA) for receiving the M encoded data streams and the another system may use global system for mobile communications (GSM). The terminal may use global system for mobile communications (GSM) for receiving the M encoded data streams and the another system may use wide band code division multiple access (WCDMA). The radio indicator may be pilot signal power, total received signal power, Ec/10, or cell identification. The M encoded data streams may be transmitted with a higher power level during the at least one identified frame than a power level used to transmit other frames of the encoded data streams.

BRIEF DESCRIPTION OF THE DRAWINGS

FIG. 4 illustrates a flow chart of the operation of the present invention.

Like reference numerals identify like parts throughout the drawings.

DESCRIPTION OF THE PREFERRED EMBODIMENTS

Figure 1:
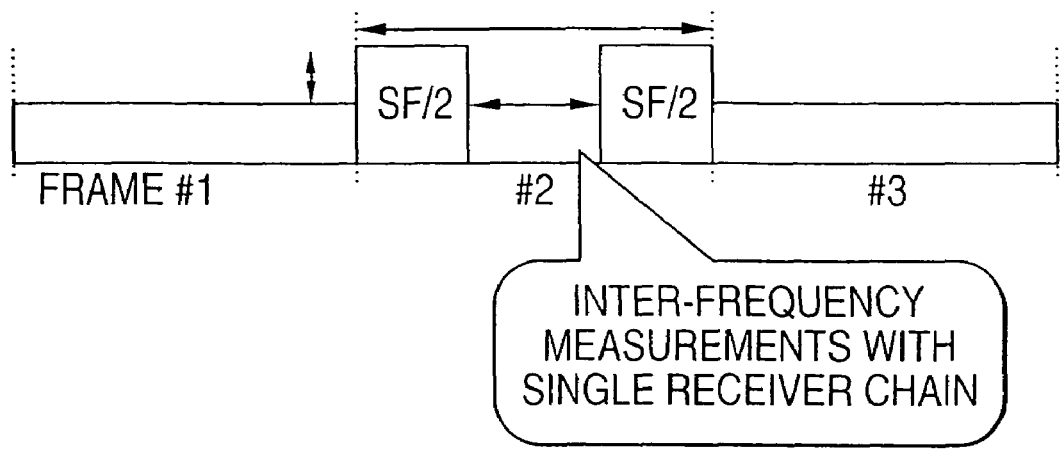
FIG. 1 illustrates the prior art compressed mode of performing inter-frequency measurements.
Figure 3:
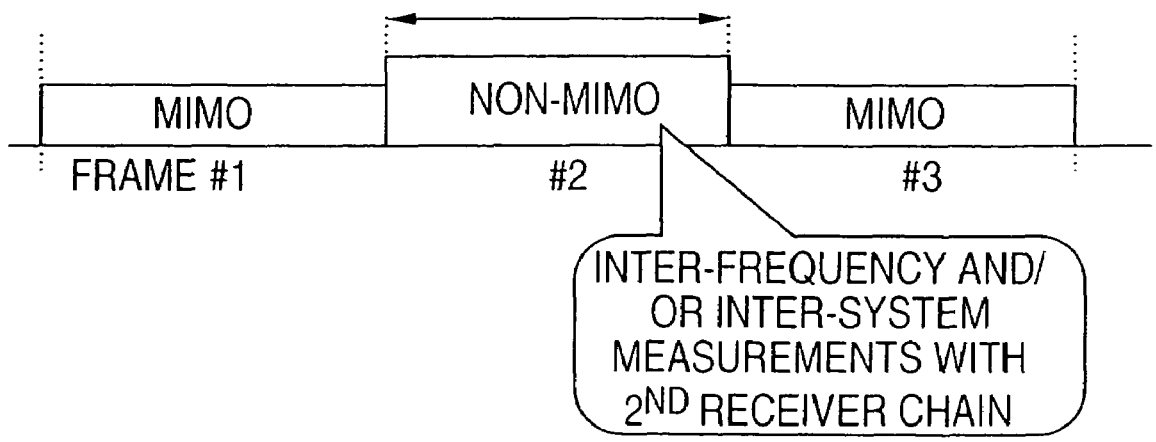
FIG. 3 illustrates a simplified block diagram of the frame transmission utilized by the present invention for making inter-frequency and or inter-system measurements with at least one receiver present in UE.
Figure 2:
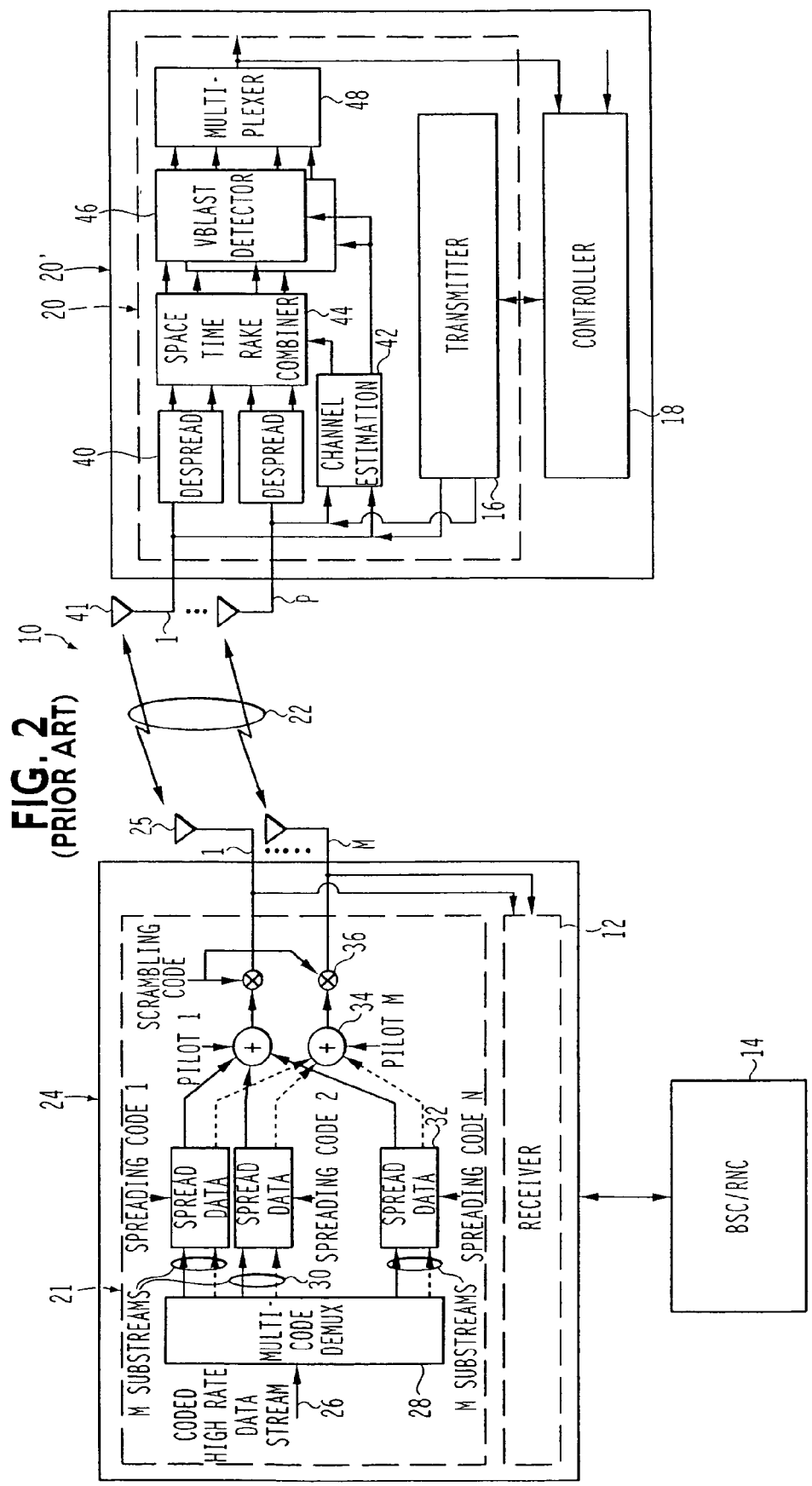
FIG. 2 illustrates a prior art MIMO system of the type in which the present invention may be practiced.

FIG. 3 illustrates a block diagram of the transmission of data frames in accordance with the present invention. The difference in operation of the invention illustrated in FIG. 3, in comparison to the prior art of FIG. 2, is eliminating the requirement for compressed mode transmissions during the making of inter-frequency and/or inter-system measurements as illustrated by frame #2. Frames #'s 1 and 3 of FIG. 3 are conventional MIMO transmissions. As illustrated in the non-MIMO frame #2, one antenna of the station transmitter 21 is disabled and at least one receiver 20 of the UE 20' has been commanded to a new inter-frequency or inter-system band in which radio indicator measurements are made and at least one other receiver 20 receives the data transmissions which is made at a higher power level represented by a higher vertical height thereof to make up for lost reception capability by the receiver used to make the measurements.

FIG. 4 illustrates a block diagram of the operation of the present invention as practiced without limitation in the prior art system of FIG. 2. Operation starts at point 100 at which detection occurs of conditions in the network or terminal (UE) indicating that inter-frequency or inter-system measurements should be made. These conditions are well known and are diverse in nature, including consideration of units in the frequency band, data error rates, etc. These conditions may be determined by the BSC/RNC 14, the transceiver 24 or the UE 20'.

The making of measurements to determine if an inter-frequency or inter-system hand-over should occur is represented by point 100. Operation proceeds to point 102 where the BSC/RNC 14 causes a message to be transmitted on the downlink control channel identifying at least one frame which will be transmitted when the transmitter 21 of transceiver 24 and the receivers 20 of the UE 20' are to be operating in non-MIMO mode to make inter-frequency or inter-system radio indicator measurements. The operation proceeds to point 104 where the terminal controller 18 causes storing of the identification of the frame(s) which will be sent in non-MIMO mode, as illustrated as an example only as the single frame #2 in FIG. 3. The controller starts to monitor the numbers of received frames to determine when to tune one MIMO receiver 20 to a new frequency band which is either an inter-frequency band within the same system or a frequency band within another system in order to make measurements of a radio indicator in the new frequency band. It should be understood that the radio indicator may be any reliable measurement criteria for determining whether a hand-over should be made to a new frequency band either on an inter-frequency basis or an inter-system basis. Such radio indicators without limitation are pilot signal power, total received signal power, Ec/10 or cell identification to name just a few, but it should be understood that the invention is not limited thereto. Ec is equal to pilot RSCP divided by RSSI wherein RSCP is received signal code power and RSSI is received signal strength indicator. The operation proceeds to point 106 where the transmitter 21 transmits the identified frame(s) with increased power while disabling one of the antennas 25 and one of the receivers 20 of the UE 20' is tuned to the new frequency band(s) to make and store the aforementioned measurements of the radio indicator and the remaining receiver(s) 20 is operated to detect the identified frames and output data from the multiplexer 48 while the aforementioned measurements are being made. The process proceeds finally to point 108 where the measurements are transmitted from the transmitter 16 of the UE 20' to the transceiver 24 and the BSC/RNC 14 decides if a hand-over to a new inter-frequency band or a new system is in order.

It should be understood that the prior art system 10 is only an exemplary embodiment of a system in which the present invention may be produced. The invention's making of radio indicator measurements with at least one receiver tuned to a new frequency band while receiving data transmitted at a higher power level in the current frequency band by at least one other receiver may be achieved and implemented in numerous ways beyond that described with reference to FIG. 2. The use of receiver chains in the architecture of FIG. 2 is only one specific implementation of multiple receivers in the UE in accordance with the invention.

While the invention has been described in terms of its preferred embodiments, it should be understood that numerous modifications may be made thereto. It is intended that all such modifications fall within the scope of the appended claims.

The invention claimed is:

1. A terminal comprising:
at least one radio transceiver including a plurality of radio receivers and at least one transmitter, each radio receiver including an antenna which receives a plurality of encoded data streams and a detecting function which decodes the plurality of encoded data streams into decoded data; and
a terminal controller which controls the at least one radio transceiver,
wherein a data transmission system includes a station which transmits the plurality of encoded data streams using a plurality antennas to the terminal and a station controller which controls the station, and
wherein in response to a transmission from the station that the terminal is to operate at least one of the radio receivers, in at least one frequency band not used to receive the plurality of encoded data streams during at least one identified data frame therein, to measure a radio indicator of the at least one frequency band not used to receive the plurality of encoded data streams, the terminal controller causes at least one of the radio receivers to be tuned to the at least one frequency band during the at least one identified data frame, to make measurements therein, and to transmit the measurements with the at least one transmitter of the at least one radio transceiver to the station and to adjust handling of feedback sent in an uplink direction accordingly to correspond to a resulting plurality of data streams less than the plurality of data streams prior to a resulting non-multiple input multiple output transmission, wherein the feedback comprises said measurement of said radio indicator sent from the terminal.

2. The terminal in accordance with claim 1, wherein the at least one frequency band is an inter-frequency band in the data transmission system.

3. The terminal in accordance with claim 2, wherein the station comprises a demultiplexer which demultiplexes an input data stream into a plurality of substreams, each substream is spread with one a plurality of spreading codes with a mutually orthogonal pilot symbol being added to a common pilot channel transmitted by each antenna; and wherein
the at least one transceiver comprises in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the plurality of data streams, and a multiplexer, coupled to the outputs of the detector which outputs a multiplexed data stream corresponding to the input data stream.

4. The terminal in accordance with claim 2, wherein the terminal uses wide band code division multiple access (WCDMA) for receiving the plurality of encoded streams.

5. The terminal in accordance with claim 2, wherein the terminal uses global system for mobile communications (GSM) for receiving the plurality encoded data streams.

6. The terminal in accordance with claim 1, wherein the at least one frequency band is in another system than the data transmission system.

7. The terminal in accordance with claim 6, wherein the station comprises a demultiplexer which demultiplexes an input data stream into a plurality of substreams, each substream is spread with one of a plurality of spreading codes with a mutually orthogonal pilot symbol being added to a common pilot channel transmitted by each antenna; and wherein
the at least one transceiver comprises in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the plurality of data streams, and a multiplexer, coupled to the outputs of the detector which outputs a multiplexed data stream corresponding to the input data stream.

8. The terminal in accordance with claim 6, wherein the terminal uses wide band code division multiple access (WCDMA) for receiving the plurality of encoded data streams and the another system uses global system for mobile communications (GSM).

9. The terminal in accordance with claim 6, wherein the terminal uses global system for mobile communications (GSM) for receiving the plurality of encoded data streams and the another system uses wide band code division multiple access (WCDMA).

10. The terminal in accordance with claim 1, wherein the station comprises a demultiplexer which demultiplexes an input data stream into a plurality of substreams, each substream is spread with one of a plurality spreading codes with a mutually orthogonal pilot symbol being added to a common pilot channel transmitted by each antenna; and wherein
the at least one transceiver comprises in each radio receiver a despreader coupled to the antenna, a space-time rake combiner which receives outputs from the despreaders, a channel estimation function coupled to each of the antennas of the radio receivers which provides a channel estimation to the space-time rake combiner, a detector is coupled to outputs of the space-time rake combiner which provides outputs of the plurality of data streams, and a multiplexer, coupled to the outputs of the detector which outputs a multiplexed data stream corresponding to the input data stream.

11. The terminal in accordance with claim 1, wherein the radio indicator comprises pilot signal power.

12. The terminal in accordance with claim 1, wherein the radio indicator comprises total received signal power.

13. The terminal in accordance with claim 1, wherein the radio indicator comprises Ec/I0.

14. The terminal in accordance with claim 1, wherein the radio indicator comprises cell identification.

15. A terminal controller comprising:
a controlling unit for controlling at least one radio transceiver of a terminal in a data transmission system, the data transmission system including a station which transmits a plurality of encoded data streams using a plurality of antennas to the terminal and a station controller which controls the station,
in response to a transmission from the station that the terminal is to operate at least one of a plurality of radio receivers in at least one radio transceiver of the terminal in at least one frequency band not used to receive the plurality of encoded data streams during at least one identified data frame therein to measure a radio indicator of the at least one frequency band not used to receive the plurality of encoded data streams, a processing unit for causing at least one of the radio receivers to be tuned to the at least one frequency band during the at least one identified data frame, to make measurements therein, for transmitting the measurements with at least one transmitter of at least one radio transceiver to the station and for adjusting handling of feedback sent in an uplink direction accordingly to correspond to a resulting plurality of data streams less than the plurality data streams prior to a resulting non-multiple input multiple output transmission, wherein the feedback comprises said measured radio indicator sent from the terminal,
wherein the at least one radio transceiver includes a plurality of radio receivers and the at least one transmitter, each radio receiver including an antenna which receives the plurality of encoded data streams and a detecting function which decodes the plurality of encoded data streams into decoded data.

16. A method comprising:
controlling, in a terminal controller, at least one radio transceiver of a terminal in a data transmission system, the data transmission system including a station which transmits a plurality of encoded data streams using a plurality of antennas to the terminal and a station controller which controls the station;
in response to a transmission from the station that the terminal is to operate at least one of the radio receivers in at least one frequency band not used to receive the plurality of encoded data streams during at least one identified data frame therein to measure a radio indicator of the at least one frequency band not used to receive the plurality encoded data streams, causing at least one of the radio receivers to be tuned to the at least one frequency band during the at least one identified data frame, to make measurements therein;
transmitting the measurements with the at least one transmitter of the at least one radio transceiver to the station; and adjusting handling of feedback sent in an uplink direction accordingly to correspond to a resulting plurality of data streams less than the plurality of data streams prior to a resulting non-multiple input multiple output transmission, wherein the feedback comprises said measured radio indicator sent from the terminal.

17. A data transmission system, comprising:

a terminal;

a station which transmits a plurality of encoded data streams using a plurality of antennas to the terminal;

a station controller which controls the station;

the terminal including at least one radio transceiver including a plurality of receivers and at least one transmitter, each radio receiver including an antenna which receives the plurality of encoded data streams and a detecting function which decodes the plurality of encoded data streams into decoded data; and a terminal controller which controls the at least one radio transceiver; and wherein in response to a transmission from the station that the terminal is to operate at least one of the radio receivers in at least one frequency band not used to receive the plurality of data streams during at least one identified data frame therein to measure a radio indicator of the at least one frequency band not used to receive the plurality of encoded data streams, the terminal controller causes at least one of the radio receivers to be tuned to the at least one frequency band during the at least one identified data frame and to make measurements of the radio energy therein, to transmit the measurements with the at least one transmitter of the at least one radio transceiver to the station and to adjust handling of feedback sent in an uplink direction accordingly to correspond to a resulting plurality of data streams less than the plurality of data streams prior to a resulting non-multiple input multiple output transmission, wherein the feedback comprises said measured radio indicator sent from the terminal.

18. An apparatus comprising:

a control unit for controlling at least one radio transceiver of a terminal in a data transmission system, the data transmission system including a station which transmits a plurality of encoded data streams using a plurality of antennas to the terminal and a station controller which controls the station;

in response to a transmission from the station that the terminal is to operate at least one of a plurality of radio receivers in at least one radio transceivers of the terminal in at least one frequency band not used to receive the plurality of encoded data streams during at least one identified data frame therein to measure a radio indicator of the at least one frequency band not used to receive the plurality of encoded data streams, processing means for causing at least one of the radio receivers to be tuned to the at least one frequency band during the at least one identified data frame and to make measurements therein, transmitting means for transmitting the measurements with at least one transmitter of at least one radio transceiver to the station, and adjusting means for adjusting handling of feedback sent in an uplink direction accordingly to correspond to a resulting plurality of data streams less than the plurality of data streams prior to a resulting non-multiple input multiple output transmission, wherein the feedback comprises said measured radio indicator sent from the terminal.

19. A network node in a station of a data transmission system, the network node comprising:

a transmitting unit for transmitting a plurality of encoded data streams using a plurality of antennas to a terminal and a station controller which controls the station;

wherein the terminal comprises at least one radio transceiver including a plurality of radio receivers and at least one transmitter, each radio receiver including an antenna which receives the plurality of encoded data streams and a detecting function which decodes the plurality of encoded data streams into decoded data and a terminal controller which controls the at least one radio transceiver, and wherein in response to a transmission from the station that the terminal is to operate at least one of the radio receivers in at least one frequency band not used to receive the plurality of encoded data streams during at least one identified data frame therein to measure a radio indicator of the at least one frequency band not used to receive the plurality of encoded data streams, the terminal controller causes at least one of the radio receivers to be tuned to the at least one frequency band during the at least one identified data frame and to make measurements therein, to transmit the measurements with the at least one transmitter of the at least one radio transceiver to the station and to adjust a handling of feedback sent in an uplink direction accordingly to correspond to a resulting plurality of data streams less than the plurality of data streams prior to a resulting non-multiple input multiple output transmission, wherein the feedback comprises said measured radio indicator sent from the terminal.

* * * * *